TELEVISION RECEIVER TUNING APPARATUS

Filed June 13, 1958 3 Sheets-Sheet 1

Jan. 23, 1962 W. R. PETRICK ETAL 3,018,326
TELEVISION RECEIVER TUNING APPARATUS
Filed June 13, 1958 3 Sheets-Sheet 2
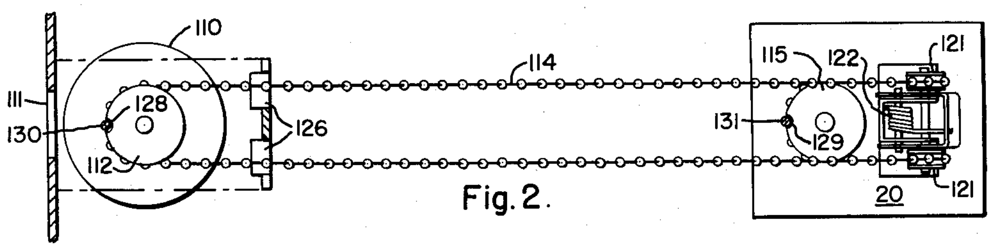
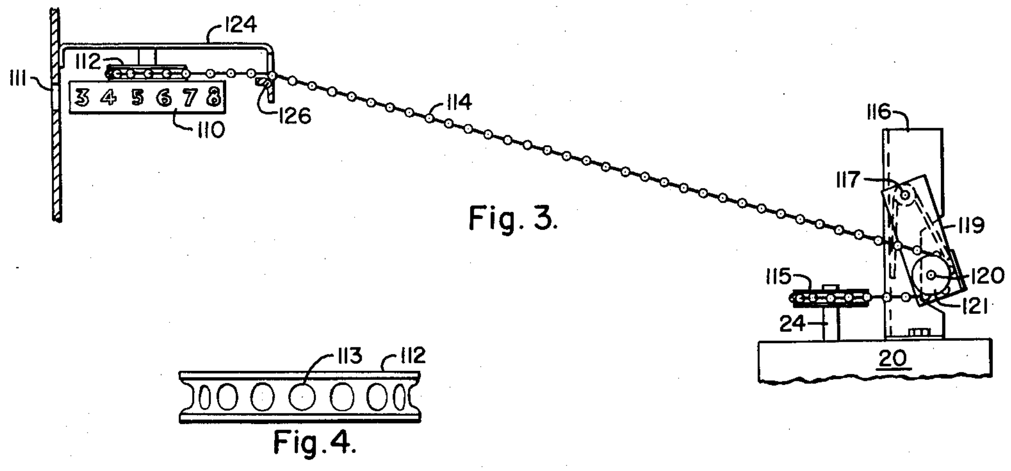
Fig. 3. Fig. 4.
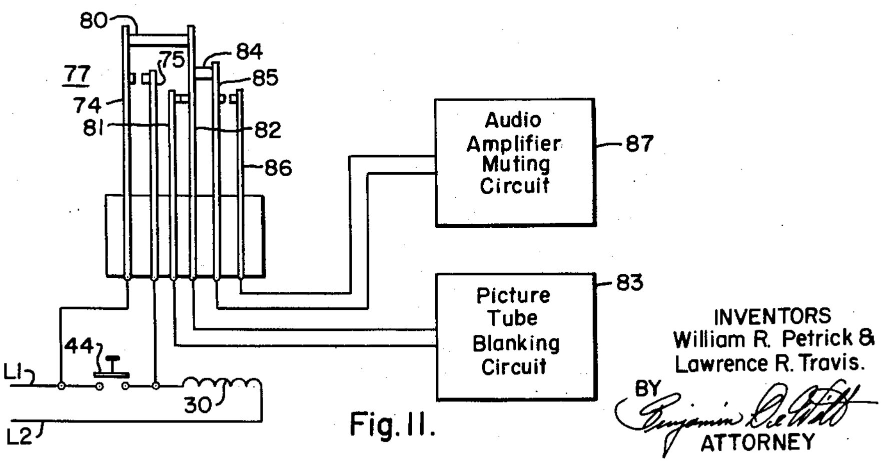
INVENTORS
William R. Petrick &
Lawrence R. Travis.
BY Benjamin DeWitt
ATTORNEY Jan. 23, 1962 W. R. PETRICK ETAL 3,018,326
TELEVISION RECEIVER TUNING APPARATUS
Filed June 13, 1958 3 Sheets-Sheet 3
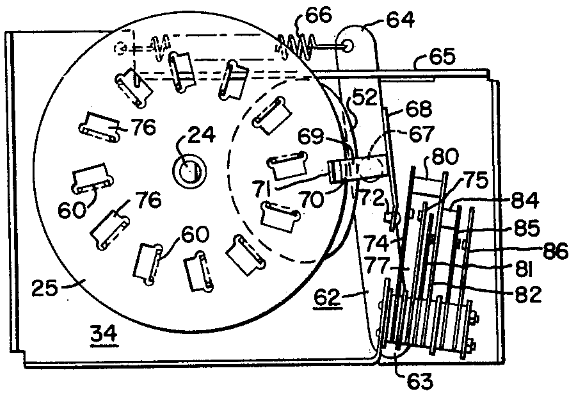
Fig. 5.
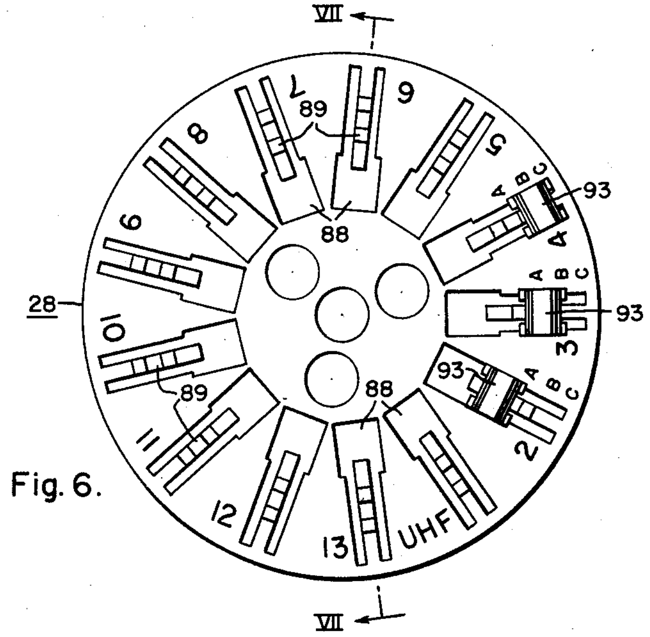
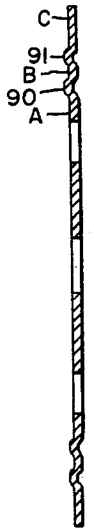
Fig. 7.
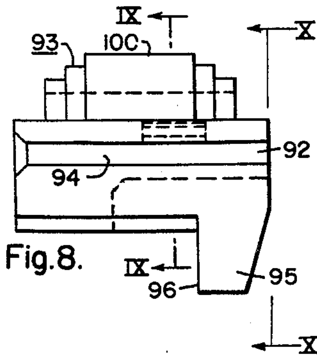
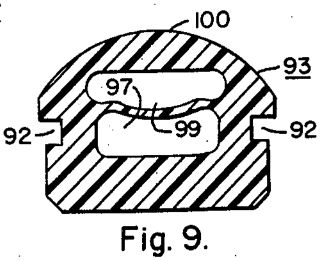
Fig. 9.
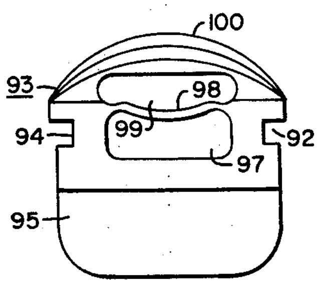
Fig. 10.

United States Patent Office 3,018,326

Patented Jan. 23, 1962

3,018,326

TELEVISION RECEIVER TUNING APPARATUS

William R. Petrick, Kenilworth, and Lawrence R. Travis, Fanwood, N.J., assignors to Westinghouse Electric Corporation, East Pittsburgh, Pa., a corporation of Pennsylvania Filed June 13, 1958, Ser. No. 741,820

15 Claims. (Cl. 178—5.8)

This invention relates to television receivers, and relates more particularly to motor-driven tuners for such receivers.

A feature of this invention is that it provides a motor-driven television tuner with a programming wheel having a slide for each television channel, each slide being slidable to a position where it will maintain a holding circuit closed for preventing the tuner motor from stopping at an inactive channel position, each slide being slidable to a second position where it will actuate a fringe switch to increase the sensitivity of the television receiver at the channel of a weak signal, while permitting the holding circuit to be opened at that channel position, and each slide being slidable to a third position where it will permit the tuner motor to stop at an active channel position.

Another feature of this invention is that it locates a motor-driven television tuner at the back of the chassis of a television adjacent the IF amplifier for increasing the efficiency of the receiver, the shafts of the motor and tuner being vertical for clearing the picture tube and permitting the use of a smaller, more compact chassis, and the programming wheel of the tuner being horizontal so that its slides can easily be adjusted from the back of the receiver.

Another feature of this invention is that dial calibration is accomplished at a location remote from the television tuner shaft. In one embodiment of this invention this is accomplished by the use of a bead-chain drive, two identical sprocket wheels, one on the tuner shaft, and the other at the front of the television receiver and attached to a channel indicating dial, and take-up mechanism. Automatic dial calibration is accomplished by providing two odd colored beads in the chain at numerically opposite positions and by providing a notch in each sprocket wheel in which the odd colored beads are placed.

Another feature of this invention is that it provides a nylon slide having a breathing diaphragm for contacting detents on a programming wheel, and having separate, independent slots for contacting the guiding sides of a groove in the programming wheel.

An object of this invention is to increase the efficiency of a television receiver.

Another object of this invention is to reduce the size of a television receiver.

Another object of this invention is to locate a motor-driven tuner of a television receiver at the back of the chassis of the receiver, with the shafts of the motor and tuner vertical, and with a horizontal programming wheel accessible from the back of the receiver.

Another object of this invention is to provide accurate calibration of a channel indicating dial of a television receiver, the dial being remotely located from the tuning shaft of its associated channel selecting tuner.

Another object of this invention is to provide a programming wheel for a television tuner, having slides adjustable to different positions for closing switches, for maintaining a switch closed, or for permitting the latter switch to open.

Another object of this invention is to provide an improved slide for the programming wheel of a motor-driven television tuner.

This invention will now be described with reference to the annexed drawings, of which:

FIG. 2 is a plan view looking down on the dial drive mechanism of FIG. 1;

FIG. 3 is a side view of FIG. 2;

FIG. 4 is a view looking at the bead receiving recesses of a sprocket wheel of the tuner;

FIG. 5 is a bottom plan view on a reduced scale, of the Geneva wheel of the tuner drive mechanism, and of switches operated by a cam of the tuner drive mechanism;

FIG. 6 is a top plan view, on a reduced scale, of the programming wheel of the tuner with some of its nylon slides;

FIG. 7 is a section along the line 7—7 of FIG. 6;

FIG. 8 is an enlarged side view of a nylon slide embodying this invention;

FIG. 9 is a section along the line 9—9 of FIG. 8;

FIG. 10 is an end view along the line 10—10 of FIG. 8 and

FIG. 11 is a circuit schematic of the circuits of the switches shown by FIGS. 1 and 5.

Figure 1:
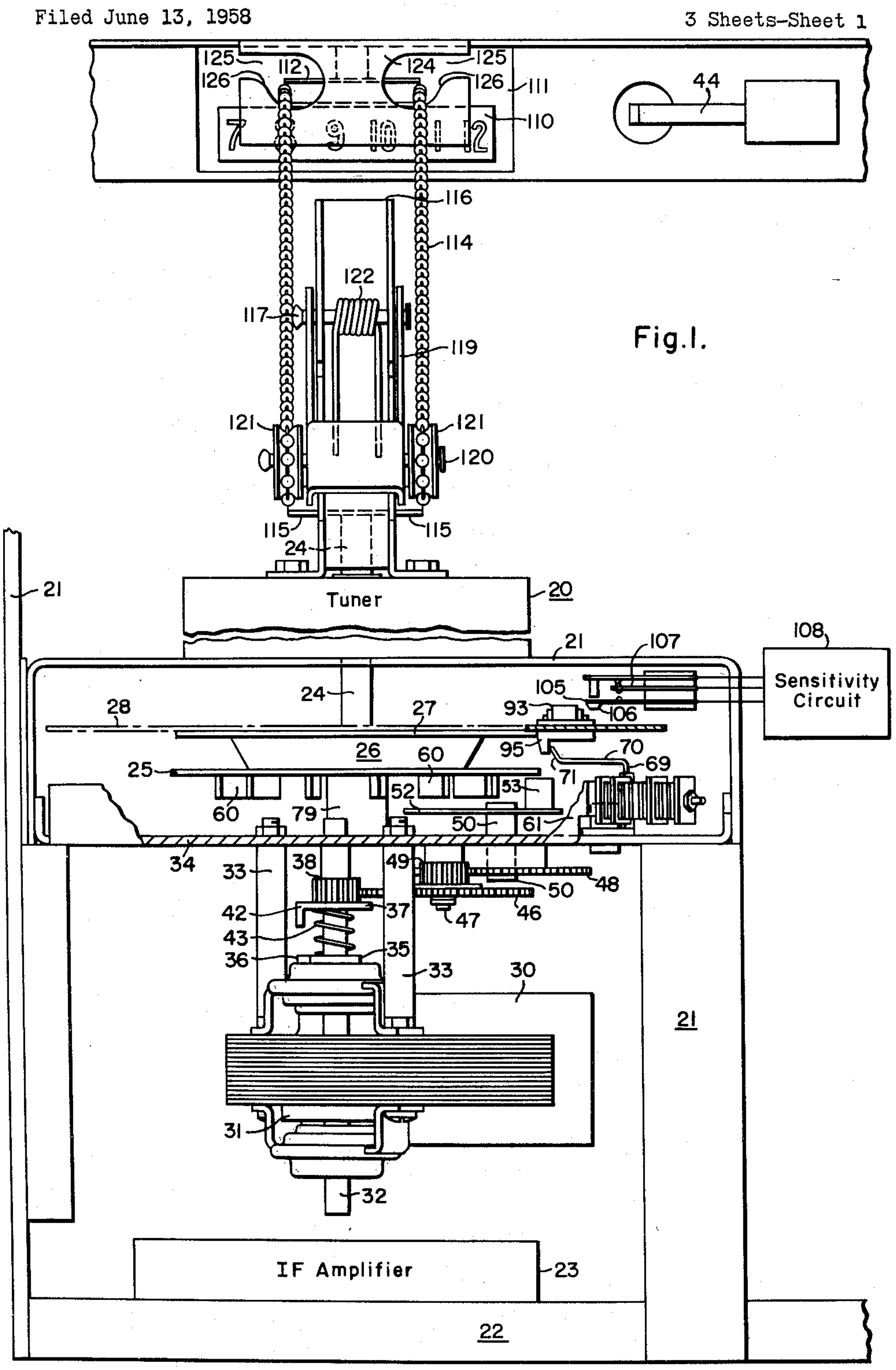
FIGURE 1 is a back view of a television tuning system embodying this invention.

A television tuner 20 is supported by framework 21 from the back and a side of a television receiver chassis 22, over and adjacent to IF amplifier 23 of the television receiver. The tuner has a vertically extending shaft 24 to which is attached, below the tuner, a Geneva wheel 25 to which is attached by spacer wheel 26 and disc 27, a programming wheel 28.

An electric motor 30 has a rotor 31 attached to shaft 32. The motor is supported by rods 33 from a horizontally extending bracket 34 which is attached to the framework 21.

A circular driving clutch member 35 is attached to the motor shaft 32, and is provided with a radial projection 36. A driven clutch member 37 to which is attached a pinion gear 38, is slidably mounted on the upper portion of the motor shaft 32. The projection 36 is adapted to engage a projection 42 of the clutch member 37. A coiled spring 43 is positioned between the clutch members 35 and 37, and normally holds the clutch member 35 in such an axial position that the projection 36 is out of engagement with the projection 42.

When the motor 30 is initially energized by the closing of a switch 44 at the front of the receiver which connects the motor to supply lines L1 and L2, the motor shaft 32 will be rotated. At the same time, the solenoid action of the motor will urge the motor shaft axially upwardly against the action of the spring 43. When the upper portion of the motor shaft is abutting the clutch member 37, the projection 36 of the clutch member 35 will engage the projection 42 of the clutch member 37, and the pinion 38 will rotate at the speed of rotation of the motor shaft.

The pinion 38 is meshed with a gear wheel 46 which rotates about a shaft 47. A pinion 49 is axially attached to the gear wheel 46 and meshes with a gear wheel 48 attached to a shaft 50. The shaft 47 is attached to the bottom of the bracket 34. The shaft 50 extends through an aperture in the bracket 34, and has secured thereto a cam 52 which carries a roller 53.

The Geneva wheel 25 has a plurality of downwardly extending tabs 60 which correspond to the number of channel positions of the tuner 20.

As best shown in FIG. 5, a switch lever 62 has one end 63 pivoted to the bracket 34, and has its other end 64 extending through an opening in a flange 65 of the bracket. A tension spring 66 is attached between the lever end 64 and a portion of the bracket. A roller 67 is attached to the lever 62 at about its mid-point. The lever 62 has a flange portion 68 to which is attached a member 69 which extends past the programming wheel 28, and which has an outer portion 70 which extends towards the center of the programming wheel, the outer portion 70 having an end portion 71 which extends perpendicular to the portion 70 and to and towards the programming wheel. The outer side of the flange portion 68 is provided with an insulated plunger 72 which is adapted to bear against one segment 74 of a holding switch 77. The segment 74 is in turn adapted to bear against another switch segment 75 of the switch 77. As the cam 52 is rotated, it contacts the roller 67 carried by the switch lever 62 and causes the switch segments 74 and 75 to touch for closing the holding circuit shown by FIG. 11, to keep the tuning motor energized once the switch 43 is closed, until the cam 52 has completed substantially a full revolution.

In the embodiment shown, the Geneva wheel 25 is provided with thirteen spaced openings 76, the tabs 60 being formed from the metal punched out of the Geneva wheel to form the openings 76. The tabs 60 extend towards the bracket 34. The roller 53 on the cam 52 is adapted successively to bear against the inner surfaces of the tabs to partially rotate the Geneva wheel 25 and the tuner shaft 24 attached thereto. Assuming that the Geneva wheel 25 is in a normal stop position as shown by FIG. 5, the roller 67 on the switch lever 62 touches the cam 52 at the low point of the latter. The tuner shaft 24 is at a particular channel position. To select a different channel, the push button switch 44 at the front of the receiver is pushed to initially energize the motor 30 which turns its shaft 32 which also is caused to move up towards the bottom of the bracket 34. This causes the clutch members 35 and 37 to engage, and the cam 52 to be rotated through its associated gearing. The rotation of the cam causes its roller 53 to engage the tabs 60 on the Geneva wheel 25 in a typical Geneva harmonic motion. This causes partial rotation of the Geneva wheel and of the tuner shaft 24 attached to the Geneva wheel.

The cam 52 is in its rest position when the roller 67 on the switch lever 62 is against the low point of the cam. One complete revolution of the cam corresponds to a single channel movement of the tuner shaft 24. During its revolution, the edge of the cam moves the roller 67 of the switch lever 62 in a direction against the bias of the spring 66 in a constant acceleration motion, causing the insulated plunger 72 to close the segments 74 and 75 of the switch 77. As the cam 52 continues to rotate, it goes through a dwell period, holding the insulated plunger 72 in position to keep the switch 77 closed. As the cam rotates through the last portion of its revolution, the lever 62 moves in the direction towards the tuner shaft aided by the action of the spring 66. At this period in the revolution of the cam, the insulated plunger 72 ceases to hold the switch 77 closed unless there is a slide on the programming wheel in a position to cause the plunger to hold the switch 77 closed as will be described later.

The motor-driven tuner described in the foregoing, except for its location, its vertically extending motor and tuner shafts, and the addition of the programming wheel, is similar to that disclosed in our co-pending application, Serial No. 591,728, filed June 18, 1956.

As best shown in FIG. 11, the switch segment 74 bears against an insulated plunger 80 carried by switch segment 82. When switch 77 is actuated by cam follower 62, plunger 80 moves segment 82 to separate segment 82 from a cooperating segment 81, thereby opening a picture tube blanking circuit 83. The switch segment 82 bears against an insulating plunger 84, carried by switch segment 85 which moves against switch segment 86 to close an audio amplifier muting circuit 87. If desired, the picture tube blanking and audio amplifier muting circuits may take the specific form described in detail in co-pending application Serial No. 745,985, filed July 1, 1958, by K. E. Farr and L. J. Sienkiewicz and assigned to the present assignee.

The programming wheel 28, as best shown in FIG. 6, is a circular disc of metal, having, in the embodiment shown, thirteen grooves 88 corresponding to thirteen channel positions, the grooves having radial center lines. Thirteen tongues 89 having radial center lines extend from near the periphery of the wheel 28 into the grooves 88 with the sides of the tongues equally spaced from the sides of the grooves. Each tongue has spaced-apart, particylindrical detents 90 and 91 formed therein. A slide position A is between a detent 90 and the inner end of a tongue. A slide position B is between the detents 90 and 91 of a tongue, and a slide position C is between an outer detent 91 and the outer end of a tongue. Slides can be inserted on the inner ends of the tongues.

The programming wheel 28 is adapted to receive in its thirteen grooves 88, thirteen nylon slides 93 having side slots 92 with vertically extending inner walls 94 which contact the sides of the grooves 88 so that the slides are slidable in the grooves to positions A, B or C. Each slide has at its inner end, a downwardly extending portion 95 with a flat, vertically extending outer side 96, extending through a groove 88 below the programming wheel, and which is adapted as shown by FIG. 1, to keep the switch 77 closed when the slide is in position A as will be described later. Each slide 93 has an opening 97 for its associated tongue 89 to pass through. An integrally formed diaphragm 98 forms the top of the opening 97 and the bottom of another opening 99 above the diaphragm. Each slide 93 has a rounded top 100 which serves as a cam for operating a sensitivity switch as will be described later.

A diaphragm 98 contacts detents 90 and 91 which hold a slide in a selected position A, B or C on the programming wheel. Radially exerted pressure on a slide will cause its diaphragm to ride over a detent so that a slide can easily be moved from one position to another from the back of the tuner. Since the detent contacting diaphragm 98 of a slide, and its groove contacting and guiding sides 92 are separate and independent, close fitting and smooth sliding of a slide result.

When a slide 93 is in position A on the programming wheel 28 as shown by FIG. 1, the vertically extending side 96 of its downwardly extending portion 95 contacts the vertically extending portion 71 of the member 69 attached to the switch lever 62, and prevents the spring 66 and the retraction of the cam edge during the last portion of a revolution of the cam 52, from causing the lever 62 to move in a direction to move the insulated plunger 72 away from the switch segment 74 with the result that the switch 77 of the motor holding circuit is maintained closed to cause the tuner shaft to move to the next adjacent channel position.

A slide 93 is placed in position A for each inactive channel so that the tuner shaft does not stop at inactive channels but continues to the next active channel where a slide 93 is in position B or C, in which positions, the downwardly extending slide portions 95 clear the vertically extending portion 71 of the member 69 attached to the switch lever 62, and do not prevent the switch 77 from opening, and stopping the tuner motor.

When the switch 77 is maintained closed by the cam 52 or by a slide in position A, the switch segment 82 is moved away from its associated switch segment 81 for operating the picture tube blanking circuit 83 for blanking out the picture tube during interchannel switching. At the same time, the switch segment 85 is moved against its associated switch segment 86 for operating the audio amplifier muting circuit 87 for preventing switching noises from being heard from the associated loud speaker during active channel seeking.

Located above the programming wheel 28 is a switch segment 105 having a cam follower 106 attached to its lower side, and extending over the line of movement of slides 93 in positions B. When a slide is in position B, as the programming wheel is rotated, such slide passes under the cam follower 106 and the latter rides up the rounded upper surface 100 of such slide, and causes the switch segment 105 to contact an associated switch segment 107 to close a conventional sensitivity circuit 108. The sensitivity circuit is operated to increase the sensitivity of the receiver as for receiving a weak signal from a distant transmitter, slides 93 being placed in positions B for all channels to be received, having weak signals.

In slide position C, a slide 93 has no effect on any switch or any circuit. Slides are placed at positions C where the corresponding channels are active and have adequate signal strength.

The programming wheel and its slides are easily accessible from the rear of the receiver chassis. The programming wheel can be turned by hand for bringing the slides in succession opposite a serviceman at the rear of the chassis so that the slides can easily be moved to their selected positions.

Since the tuner is located at the rear of the chassis, a channel indicating dial 110 is provided at the front of the receiver for indicating to an operator of the receiver which channel is being received.

The channel indicating dial 110 is horizontal, and has its vertical axis behind the front of the receiver. The front portion of the dial is visible through an opening 111 in the front of the receiver. The dial has a nylon sprocket wheel 112 attached axially thereto, and which has spaced-apart, circular indentations 113 for receiving the beads of a bead chain 114 which passes partially around the sprocket wheel 112 for rotating same. A similar sprocket wheel 115 is attached to the upper end of the tuner shaft 24, with the bead chain 114 passing partially therearound for driving the bead chain and the sprocket 112 from the tuner shaft. A vertically extending channel member 116 is attached to the top of the tuner 20, and has pivoted thereto about a shaft 117, a take-up mechanism consisting of a member 119 having a shaft 120 below and to the rear of the shaft 117, and nylon pulleys 121 on the ends of the shaft 120. The pulleys 121 are on the opposite side of the sprocket wheel 115 from the sprocket wheel 112, and have threaded therearound the bead chain 114. A coiled spring 122 extends around the shaft 117 with one end contacting the channel 116 and the other end contacting the member 119 in such a way that the spring 122 urges the pulleys 121 in a direction to tighten the bead chain around the two sprocket wheels.

The pulleys 121 and the sprocket wheel 115 are below the sprocket wheel 112, and for guiding the two passes of the bead chain 114 in their up and down movements, a guide member 124 attached to the front of the receiver, has two spaced-apart cut-outs 125 with curved, sloped lower guide portions 126 which the two passes of the chain contact as they pass between the pulleys 121 and the upper sprocket wheel 112.

For providing accurate dial calibration, the sprocket wheel 112 is provided with a notch 128 in one of its edges, and the sprocket wheel 115 is provided with a similar notch 129 in one of its edges. The bead chain 114 has two beads 130 and 131 colored differently or otherwise differently identified from the other beads of the chain 114, and which are so spaced apart along the chain that when one bead 130 is located at the notch 128 in the sprocket wheel 112, and the other bead 131 is located at the notch 129 in the sprocket wheel 115, the channel seen through the slot 111 on the dial 110 is the channel to which the tuner is tuned. If for any reason misalignment appears, realignment is easily accomplished by pushing in the member 119 from the rear of the chassis towards the front of the chassis to cause slack in the chain, following which one or the other of the sprocket wheels can be rotated while preventing the chain from rotating, until its associated odd-colored bead is at the notch in the sprocket wheel. This, like the positioning of the slides 93, is easily accomplished at the rear of the receiver.

While there has been shown and described what at present is considered to be the preferred embodiment of the present invention, it will be obvious to those skilled in the art that the invention is not so limited, but is susceptible of various changes and modifications without departing from the spirit and scope thereof.

We claim as our invention:

1. A television receiver having a chassis, a calibrated channel indicating dial at the front of said receiver, means at said front of said receiver for supporting said dial for rotation, a motor-driven tuner at the back of said receiver, said tuner having a rotary shaft, means for supporting said tuner with its said shaft vertical relative to said chassis, and means connected to said shaft and to said dial for rotating said dial in step with the rotation of said tuner shaft.

2. A television receiver having a chassis, a calibrated channel indicating dial at the front of said receiver, means at said front of said receiver for supporting said dial for rotation, a motor-driven tuner at the back of said receiver, said tuner having a rotary shaft, means for supporting said tuner with said shaft vertical relative to said chassis, a first sprocket wheel attached to said tuner shaft, a second sprocket wheel axially attached to said dial, a bead chain around said wheels, and a take-up mechanism having pulleys in contact with said chain between said wheels.

3. A television receiver having a chassis, a calibrated channel indicating dial at the front of said receiver, means at said front of said receiver for supporting said dial for rotation, a motor-driven tuner at the back of said receiver, said tuner having a rotary shaft, means for supporting said tuner with said shaft vertical relative to said chassis, a first sprocket wheel attached to said tuner shaft, a second sprocket wheel axially attached to said dial, a bead chain around said wheels, a pair of spaced-apart beads on said chain different from the other beads on said chain, said other beads being similar, each of said sprocket wheels having a bead locating mark, and said beads of said pair being located on said wheels at said marks.

4. A television receiver having a chassis, a horizontally extending, calibrated, channel indicating dial at the front of said receiver, a first sprocket wheel axially attached to said dial, means at said front of said receiver for supporting said dial for rotation, a motor-driven tuner at the back of said receiver, said tuner having a vertically extending rotary shaft with an upper portion extending above said tuner but below said sprocket wheel, means for supporting said tuner from said chassis, a second sprocket wheel attached to said upper portion of said tuner shaft, a bead chain around said sprocket wheels, and a chain take-up mechanism between said wheels, said mechanism comprising a member attached to the top of said tuner and extending vertically above said tuner, on the opposite side of said second wheel from said first wheel, a second member pivoted to the upper portion of said member on the opposite side thereof from said second wheel, a pair of pulleys rotatably supported from said second member below where it is pivoted to said first mentioned member, in contact with said chain between said wheels, and spring means for urging said second member about its pivot to said first mentioned member in a direction to cause said pulleys to tighten said chain about said sprocket wheels.

5. A television receiver having a chassis, a horizontally extending, calibrated, channel indicating dial at the front of said receiver, a first sprocket wheel axially attached to said dial, means at said front of said receiver for supporting said dial for rotation, a motor-driven tuner at the back of said receiver, said tuner having a vertically extending rotary shaft with an upper portion extending above said tuner but below said sprocket wheel, means for supporting said tuner from said chassis, a second sprocket wheel attached to said upper portion of said tuner shaft, a bead chain around said sprocket wheels, a pair of spaced-apart beads on said chain different from the other beads on said chain, said other beads being similar, each of said sprocket wheels having a bead locating mark, and said beads of said pair being located on said wheels at said marks when said tuner is tuned to a particular channel.

6. A television receiver having a chassis, a channel selecting tuner having a rotary shaft, means for supporting said tuner with said shaft vertical from said chassis above the back portion thereof, said shaft having a lower portion extending below said tuner, a horizontally extending programming wheel attached to said lower portion of said shaft, means including an electric motor below said wheel for rotating said shaft to successive channel positions, means including a switch at the front of said receiver for energizing said motor, means including a cam driven by said motor and a holding switch closed by said cam while said tuner shaft is moving between channel positions for establishing a holding circuit across said first mentioned switch for maintaining said motor energized until said tuner shaft has been moved to a channel position, and for causing said holding switch to open when said tuner shaft is at a channel position, said programming wheel having slides corresponding in number to the number of channel positions of said tuner, said slides being slidable to holding switch closing positions, said holding switch having lever means for contacting those of said slides in said switch closing positions, said lever means holding said holding switch closed while said lever means is in contact with a slide, said slides being slidable to other positions where they do not contact said lever means during rotation of said programming wheel.

7. A television receiver having a chassis, a channel selecting tuner having a rotary shaft, means for supporting said tuner with said shaft vertical from said chassis above the back portion thereof, said shaft having a lower portion extending below said tuner, a horizontally extending programming wheel attached to said lower portion of said shaft, means including an electric motor below said wheel for rotating said shaft to successive channel positions, means including a switch at the front of said receiver for energizing said motor, means including a cam driven by said motor and a holding switch closed by said cam while said tuner shaft is moving between channel positions for establishing a holding circuit across said first mentioned switch for maintaining said motor energized until said tuner shaft has been moved to a channel position, and for causing said holding switch to open when said tuner shaft is at a channel position, said programming wheel having slides corresponding in number to the number of channel positions of said tuner, said slides being slidable to holding switch closing positions, said holding switch having lever means for contacting those of said slides in said switch closing positions, said lever means holding said holding switch closed while said lever means is in contact with a slide, said receiver having a picture tube blanking circuit including a switch for opening said blanking circuit, and means for opening said last mentioned switch when said holding switch is closed.

8. A television receiver having a chassis, a channel selecting tuner having a rotary shaft, means for supporting said tuner with said shaft vertical from said chassis above the back portion thereof, said shaft having a lower portion extending below said tuner, a horizontally extending programming wheel attached to said lower portion of said shaft, means including an electric motor below said wheel for rotating said shaft to successive channel positions, means including a swtich at the front of said receiver for energizing said motor, means including a cam driven by said motor and a holding switch closed by said cam while said tuner shaft is moving between channel positions for establishing a holding circuit across said first mentioned switch for maintaining said motor energized until said tuner shaft has been moved to a channel position, and for causing said holding switch to open when said tuner shaft is at a channel position, said programming wheel having slides corresponding in number to the number of channel positions of said tuner, said slides being slidable to holding switch closing positions, said holding switch having lever means for contacting those of said slides in said switch closing positions, said lever means holding said holding switch closed while said lever means is in contact with a slide, said receiver having an audio amplifier muting circuit, including a switch for closing said circuit, and means for closing said last mentioned switch when said holding switch is closed.

9. A television receiver having a chassis, a channel selecting tuner having a rotary shaft, means for supporting said tuner with said shaft vertical from said chassis above the back portion thereof, said shaft having a lower portion extending below said tuner, a horizontally extending programming wheel attached to said lower portion of said shaft, means including an electric motor below said wheel for rotating said shaft to successive channel positions, means including a switch at the front of said receiver for energizing said motor, means including a cam driven by said motor and a holding switch closed by said cam while said tuner shaft is moving between channel positions for establishing a holding circuit across said first mentioned switch for maintaining said motor energized until said tuner shaft has been moved to a channel position, and for causing said holding switch to open when said tuner shaft is at a channel position, said programming wheel having slides corresponding in number to the number of channel positions of said tuner, said slides being slidable to holding switch closing positions, said holding switch having lever means for contacting those of said slides in said switch closing positions, said lever means holding said holding switch closed while said lever means is in contact with a slide, said slides being slidable to other positions where they do not contact said lever means during rotation of said programming wheel, a receiver sensitivity control circuit, and a switch connected to said control circuit and located adjacent said programming wheel in a position to contact said slides for operating said last mentioned switch when said slides are in one of said other positions.

10. A programming wheel for a television tuner comprising a circular disc having a plurality of spaced-apart slots extending from near the periphery of said disc towards the center of said disc, each of said slots having parallel sides equidistant from a radial center line, said disc having tongues extending in said slots from the outer ends of said slots to short of the inner ends of said slots, each of said tongues having parallel sides spaced equal distances from the corresponding sides of its respective slot, said tongues having detents formed thereon for holding slider members to be placed in said slots at predetermined positions.

11. A programming wheel for a television tuner comprising a circular disc having a plurality of spaced-apart slots extending from near the periphery of said disc towards the center of said disc, each of said slots having parallel sides equidistant from a radial center line, said disc having tongues extending in said slots from the outer ends of said slots to short of the inner ends of said slots, each of said tongues having parallel sides spaced equal distances from the corresponding sides of its respective slot, said tongues having detents thereon, and slider members of resilient material encompassing said tongues, said slider members having slotted sides contacting said sides of said slots, and having diaphragms contacting said detents.

12. A programming wheel for a television tuner comprising a circular disc having a plurality of spaced- prising a circular disc having a plurality of spaced-apart slots extending from near the periphery of said disc towards the center of said disc, each of said slots having parallel sides equidistant from a radial center line, said disc having tongues extending in said slots from the outer ends of said slots to short of the inner ends of said slots, each of said tongues having parallel sides spaced equal distances from the corresponding sides of its respective slot, said tongues having detents thereon, and slider members of resilient material encompassing said tongues, said slider members having slotted sides contacting said sides of said slots, and having diaphragms contacting said detents, each of said tongues having a pair of detents so spaced apart along the length of the tongue that a tongue encompassing slider member is slidable to three predetermined positions where its diaphragm is in contact with a detent, one position being between the outer edge of the tongue and a first of said detents, a second position being between the said detents, and the third position being between the inner detent and the inner edge of the tongue.

13. A programming wheel for a television tuner comprising a circular disc having a plurality of spaced-apart slots extending from near the periphery of said disc towards the center of said disc, each of said slots having parallel sides equidistant from a radial center line, said disc having tongues extending in said slots from the outer ends of said slots to short of the inner ends of said slots, each of said tongues having parallel sides spaced equal distances from the corresponding sides of its respective slot, said tongues having detents thereon, and slider members of resilient material encompassing said tongues, said slider members having slotted sides contacting said sides of said slots, and having diaphragms contacting said detents, each of said slider members further having a rounded cam surface on one side of said disc, and a flat surface on the opposite side of said disc extending perpendicular to the plane of said disc.

14. A slider member for a programming wheel of a television tuner, comprising a block of nylon having opposite longitudinal sides with recesses therein, each of said recesses having three flat sides formed by said block, two of said flat sides being opposite and parallel, and the other flat side being the inner side of its respective recess and extending perpendicular to the other flat sides, said block having an integrally formed diaphragm between said longitudinal sides, and having longitudinal passages therethrough on opposite sides of said diaphragm.

15. A slider member for a programming wheel of a television tuner, comprising a block of nylon having opposite longitudinal sides with recesses therein, each of said recesses having three flat sides formed by said block, two of said flat sides being opposite and parallel, and the other flat side being the inner side of its respective recess and extending perpendicular to the other flat sides, said block having an integrally formed diaphragm between said longitudinal sides, a body portion having a rounded outer surface on one side of said diaphragm and, on the opposite side of said diaphragm, another body portion having at one longitudinal end a portion extending outwardly beyond said other body portion, and having a flat side, a plane extending through said last mentioned flat side being perpendicular to a plane extending through one of said first mentioned flat sides and to a plane extending through said inner side.

References Cited in the file of this patent

UNITED STATES PATENTS

| | | |
|---|---|---|
| 2,755,424 | Papitto | July 17, 1956 |
| 2,812,486 | Foster | Nov. 5, 1957 |
| 2,816,259 | Papitto | Dec. 10, 1957 |

OTHER REFERENCES

Rider Television Manual, vol. 22: General Electric, pages 23 to 25; Motorola, pages 29 to 32; Copyrighted Feb. 3, 1958. (Available in U.S. Patent Office Scientific Library.)